US008788389B1

(12) United States Patent
Fernandes (10) Patent No.: US 8,788,389 B1
(45) Date of Patent: Jul. 22, 2014

(54) METHODS AND SYSTEMS FOR PROVIDING A CUSTOMER CONTROLLED ACCOUNT LOCK FEATURE

(71) Applicant: MOBIbucks Corporation, Sunnyvale, CA (US)

(72) Inventor: Jorge M. Fernandes, Los Altos, CA (US)

(73) Assignee: Quisk, Inc., Sunnyvale, CA (US)

( * ) Notice: Subject to any disclaimer, the term of this patent is extended or adjusted under 35 U.S.C. 154(b) by 0 days.

(21) Appl. No.: 14/022,041

(22) Filed: Sep. 9, 2013

Related U.S. Application Data

(60) Provisional application No. 61/816,631, filed on Apr. 26, 2013.

(51) Int. Cl.
*G06Q 40/00* (2012.01)
*G06Q 40/02* (2012.01)

(52) U.S. Cl.
CPC .................................. *G06Q 40/02* (2013.01)
USPC ............................................. 705/35; 705/42

(58) Field of Classification Search
USPC ...................................................... 705/35, 42
See application file for complete search history.

(56) References Cited

U.S. PATENT DOCUMENTS

| 7,712,655 | B2 | 5/2010 | Wong |
| 7,983,979 | B2 * | 7/2011 | Holland, IV ..................... 705/37 |
| 8,186,578 | B1 * | 5/2012 | Block et al. ..................... 235/379 |
| 8,303,187 | B2 | 11/2012 | Udall et al. |
| 8,479,978 | B1 * | 7/2013 | Miller et al. ..................... 235/379 |
| 2010/0312700 | A1 * | 12/2010 | Coulter et al. .................. 705/42 |
| 2011/0191237 | A1 * | 8/2011 | Faith et al. ...................... 705/39 |
| 2012/0265682 | A1 * | 10/2012 | Menon ............................. 705/44 |
| 2013/0013480 | A1 * | 1/2013 | Venter ............................. 705/35 |

FOREIGN PATENT DOCUMENTS

| IN | 200900192 I4 * | 2/2009 |
| WO | 2007027791 A | 3/2007 |
| WO | 2010059270 A1 | 5/2010 |

OTHER PUBLICATIONS

New Diebold Innovation Helps Consumers Secure Their Bank Cards and Accounts North Canton, Ohio, Oct. 12, 2011 /PRNewswire via COMTEX.*
All Text Banking Commands, Mobile Banking—Mobile, Text and App Banking, Wells Fargo, www.wellsfargo.com/mobile/, Accessed on Apr. 23, 2013.
Andrew, Remote Lock Android with an SMS, Mobile Device Manager, Jan. 30, 2012, Accessed on Apr. 23, 2013, www.mobiledevicemanager.com/mobile-device-security/remote-lock-android-with-sms/.
Coxworth, UniKey Replaces physical door lock key with an app, Gizmag, May 22, 2012, accessed online on Apr. 23, 2013, www.gizmag.com/unikey-door-lock-app/22635/.

(Continued)

*Primary Examiner* — William Rankins
(74) *Attorney, Agent, or Firm* — The Mueller Law Office, P.C.

(57) ABSTRACT

This disclosure includes methods and systems for limiting the transfer of funds from an account after a lock feature for the account has been engaged in response to an account lock request. The account lock request can be sent via an SMS message. The lock request can limit the transfer of funds from the account, and generally limit usage of the account for financial transactions. The account can be a funding source for a payment account.

9 Claims, 5 Drawing Sheets

(56) References Cited

OTHER PUBLICATIONS eText Your Way, Park Community Federal Credit Union, Accessed on Apr. 23, 2013, www.parkcommunity.com/wp-content/uploads/2012/10/eText-Your-Way.pdf.

Lockitron Manual, Lockitron, 1.6 Edition Feb. 2012, Apigy, Inc., Palo Alto, CA, Accessed on Apr. 23, 2013, lockitron.com/pdf/lockitron_manual_deadbolt_1_6.pdf.

Mobile Banking—Mobile, Text and App Banking, Wells Fargo, www.wellsfargo.com/mobile/, Accessed on Apr. 23, 2013.

Mobile Help Page, Lockitron, Accessed on Apr. 23, 2013, lockitron.com/help/mobile.

Mobile-Banking, Park Community Federal Credit Union, Accessed on Sep. 6, 2013 at http://web.archive.org/web/20120624020800/http:/www.parkcommunity.com/online-services/mobile-banking.htm.

Mobile: Text Banking FAQ, Park Community Federal Credit Union, Accessed on Apr. 23, 2013, www.parkcommunity.com/services/mobile-banking/text-banking-faq/#q1.

Saenz, Unlock your door with your phone, text a key to a friend—Lockitron is awesome (Video), Singularity HUB, May 24, 2011, Accessed on Apr. 23, 2013, singularityhub.com/2011/05/24/unlock-your-door-with-your-phone-text-a-key-to-a-friend-lockitron-is-awesome-video/.

Services: Mobile Banking, Park Community Federal Credit Union, Accessed on Apr. 23, 2013, www.parkcommunity.com/services/mobile-banking/.

* cited by examiner

METHODS AND SYSTEMS FOR PROVIDING A CUSTOMER CONTROLLED ACCOUNT LOCK FEATURE

CROSS-REFERENCE TO RELATED APPLICATION

This application claims the benefit of provisional Application No. 61/816,631, filed Apr. 26, 2013, which is incorporated herein by reference in its entirety.

BACKGROUND

The number of electronic accounts utilized by the average person has increased considerably in the recent past. This increase has been accompanied by a commensurate increase in the susceptibility of the average consumer to identity theft and the related harms incurred by the unauthorized access of such electronic accounts. Electronic accounts associated with financial institutions and payment services are of particular concern as unauthorized access to these accounts jeopardizes a consumer's economic well-being and creates significant fraud-related costs for society as a whole.

Recently, methods have been introduced to allow users greater degrees of security for their electronic accounts. Among other advances, there have been considerable improvements in the creation and implementation of tighter verification protocols, more accurate fraud detection methods, and faster fraud response techniques. In particular, verification protocols that combine what you know, what you have, and what you are methods of verification have significantly mitigated the potential for identity theft and unauthorized electronic account access. Furthermore, many techniques have sought to utilize faster means of processing and analyzing data for potential fraud, as well as faster means of communication, to more quickly identify and limit fraud related losses. However, the incentives for unscrupulous parties to circumvent these systems are immense, and the financial and electronic security industries need to continually innovate to stay a step ahead.

Many methods for fraud detection and account protection have centered on the production, distribution, and exchange of encrypted credentials to and among various devices involved with a transaction. The devices used in the transaction must therefore be robust enough to store and manipulate these credentials. This is often achieved through the use of onboard processing or storage components on account access devices that are exclusively utilized for fraud prevention and account security.

BRIEF SUMMARY

In certain embodiments of the invention, a computer-implemented method for locking an account is provided. The method includes a step of receiving an account lock request for the account via an SMS message from an account holder. The method also includes engaging a lock feature provided for the account in direct response to receiving the SMS message. The method also includes restricting a transfer of funds from the account while the lock feature is engaged.

In certain embodiments of the invention, a computer-implemented method for providing a user with an account lock feature for an electronic financial account is provided. The method includes a step of receiving, at a server device from a device associated with the user, a request to lock the electronic financial account. The request is routed through a short message component or a data message component of a communication system. The device associated with the user is used to communicate via the communication system. The method also includes a step of producing, using a processor in communication with the server device and in response to the request to lock the electronic financial account, a lock account command. The lock account command is used to limit usage of the electronic financial account for a financial transaction. The method also includes a step of receiving, at the server device, a request to unlock the electronic financial account. The method also includes a step of producing, using the processor and in response to the request to unlock the account, an account unlock command. The account unlock command is used to restore functionality associated with the electronic financial account. The user is an owner of the electronic financial account.

In certain embodiments of the invention, a computer-implemented method for providing security to an electronic payment account is provided. The method includes a step of administrating the electronic payment account. The electronic payment account allows an account holder to make payments from a payment account administrated by a financial institution. The method also includes receiving a lock request at a server device from an account holder. The method also includes generating a lock command directly in response to receiving the lock request. The method also includes sending the lock command to the financial institution. The lock command instructs the financial institution to restrict transfers from a funding source account to the payment account.

DETAILED DESCRIPTION

The present disclosure relates to electronic accounts. In particular, the present disclosure relates to modifying the functionality of and access to electronic accounts. In the following description, for purposes of explanation, numerous examples and specific details are set forth in order to provide a thorough understanding of the present disclosure. However, it will be evident to one skilled in the art that the present disclosure may include some or all of the features in these examples alone or in combination with other features described below, and may further include modifications and equivalents of the features and concepts described herein that are generally known to those with experience in the field of electronic account access and security.

In this document, various methods, processes and procedures are detailed. Although particular steps may be described in a certain sequence, such sequence is mainly for convenience and clarity. A particular step may be repeated more than once, may occur before or after other steps (even if those steps are otherwise described in another sequence), and may occur in parallel with other steps. A second step is required to follow a first step only when the first step must be completed before the second step is begun. Such a situation will be specifically pointed out when not clear from the context. A particular step may be omitted; a particular step is required only when its omission would materially impact another step.

In this document, various computer-implemented methods, processes and procedures are described. It is to be understood that the various actions (receiving, storing, sending, communicating, displaying, etc.) are performed by a hardware device, even if the action may be authorized, initiated or triggered by a user, or even if the hardware device is controlled by a computer program, software, firmware, etc. Further, it is to be understood that the hardware device is operating on data, even if the data may represent concepts or real-world objects, thus the explicit labeling as "data" as such is omitted. For example, when the hardware device is described as "storing a record", it is to be understood that the hardware device is storing data that represents the record.

Specific embodiments of the invention described herein allow a user to limit the functionality of an account by engaging a lock feature associated with the account. The lock feature can include the use of a meta-key that locks access to the account or limits the functionality of the account regardless of the usage of a key that would regularly access the system such as a user name and password combination, the entry of a personal identification number (PIN) at a point of sale terminal, or the provisioning of credentials using a magnetic strip card or near field communication (NFC) device. In situations where the account is a financial account that is capable of conducting transactions through the use of stored funds or the extension of credit, the lock feature can also restrict a transfer of funds from the account while the lock is engaged. The lock feature can be engaged and disengaged via a lock request or unlock request sent by the account holder. The request can be sent via a text message or SMS compliant communication. In such a situation, the informational content of the text message or SMS compliant communication can be referred to as lock message or unlock message. In general, disclosures herein related to lock messages and lock requests also apply to unlock messages and unlock requests. Text messages and all SMS compliant communications are both referred to in the disclosure below as short messages.

Figure 1:
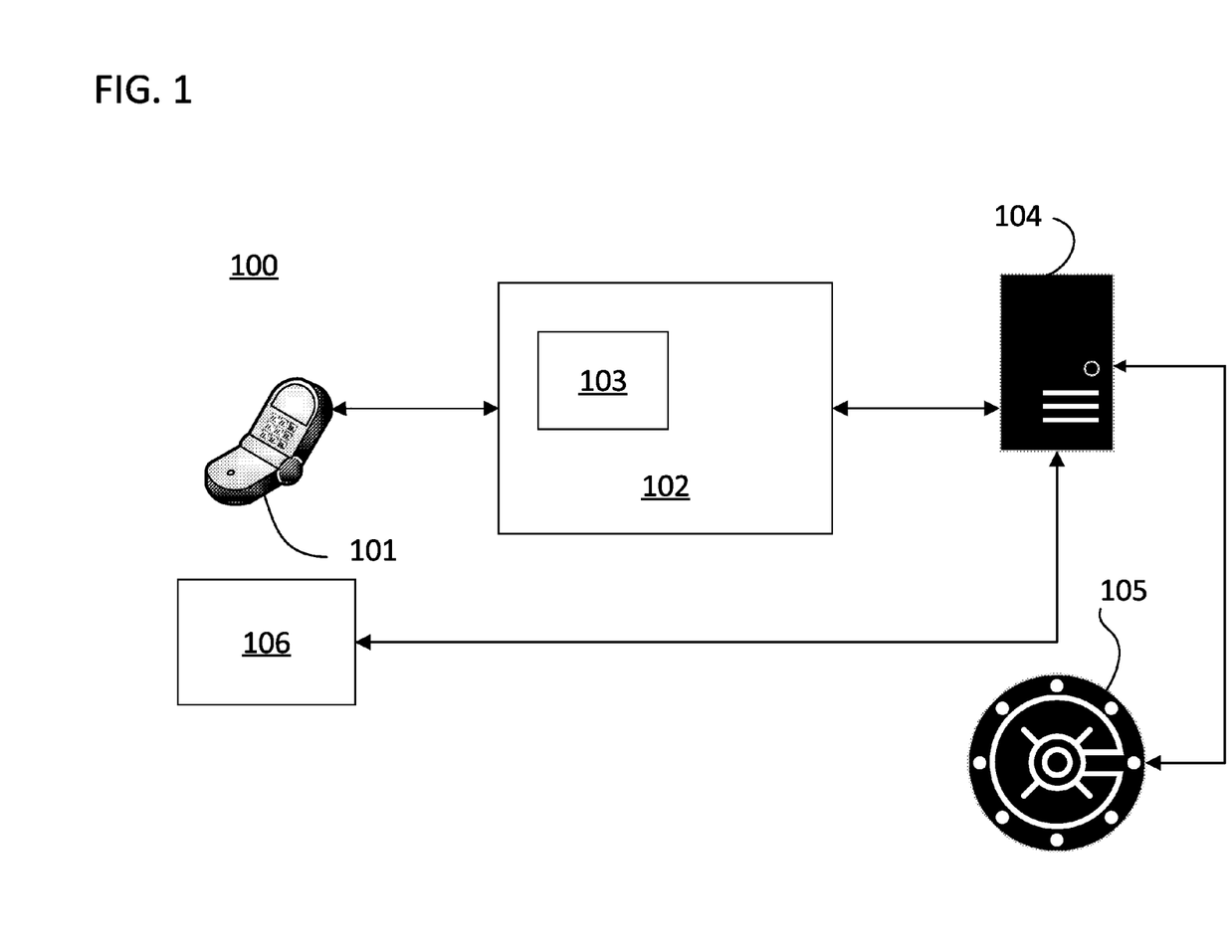
FIG. 1 is a block diagram of an account control system that is in accordance with an embodiment of the present invention.

FIG. 1 illustrates a system 100 that can be utilized in accordance with specific embodiments of the present invention. System 100 includes a device associated with an account holder 101, a communication system 102 with a short message component 103, a server device 104, an account 105, and an optional second device 106. The device associated with user 101 can be temporarily associated with the user solely for the purpose of sending a lock request or it may be more permanently associated with the user. For example, the device associated with user 101 could be the user's mobile phone. However, the device could also be a mobile device that is specifically designed for use with system 100. The device 101 could be used to communicate via the communication system 102. The communication system 102 could comprise a mobile phone network, the Internet, a proprietary communications network, the plain old telephone system (POTS), or any combination of these various networks. Server device 104 is drawn as a single machine, but multiple machines working in combination would generally be needed to facilitate the methods described herein if the account lock feature were to be provided to a large number of account holders. The individual machines could be in the same data center or spread out over a wide geographical area over which the account lock feature was offered. Servers such as server device 104 used in combination with the embodiments described herein could be run by an entity that provided the account lock feature as a stand-alone feature used to augment an account 105 administrated by an alternative entity. However, servers such as server device 104 could also be provided by the same entity that administrates account 105. For example, a payment service provider could administrate both account 105 and operate server device 104; while an account security service provider could operate server device 104 to provide additional security to an electronic account 105 offered by a separate entity.

Optional second device 106 could be used to send the lock and/or unlock requests. The optional second device 106 can allow a different party to participate in the engagement of the lock feature or may provide an additional layer of security to the overall system by requiring a user to be in communication with server device 104 through two different channels. As an example of a situation in which the optional second device 106 is associated with the user, the optional second device 106 could be a personal computer, a user's home telephone, a smart phone running a specialized application, or a device issued by a service provider specifically for purposes of issuing the unlock requests. As an example of a situation in which the optional second device 106 is under the control of someone besides the user, a fraud monitoring service or other account service entity might collect information from various sources, and then issue an unlock request based on a determination made using those sources. The service could, for example, contact the user via telephone and ask the user why the account was locked or why an unlock request was made and, in situation where the account was locked, perform certain security checks before allowing the account to be unlocked. The optional second device could communicate with server device 104 using communication system 102, and could more generally communicate with server device via any form of communication such as the Internet, physical mail, fax, a mobile phone network, a wired telephone network, or a specialized network configured specifically for facilitating communication between server device 104 and second device 106. As drawn, second device 106 communicates with server device 104 through a separate channel to provide the increased security of two channel communication mentioned above.

Figure 2:
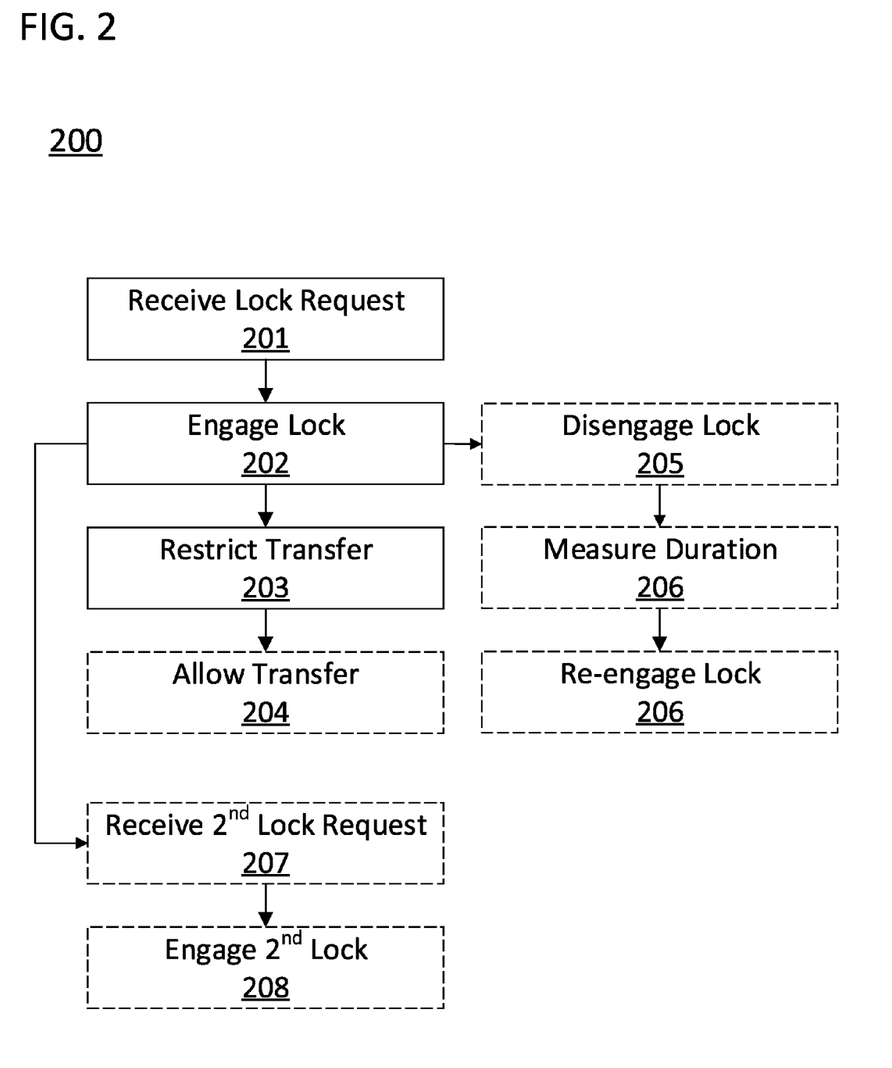
FIG. 2 is a flow chart illustrating a set of methods for locking an account at the direction of an account holder that are in accordance with an embodiment of the present invention.

FIG. 2 illustrates a method 200 that can be used to describe various embodiments of the invention in which a lock feature is provided for a financial account. Method 200 begins with step 201 in which an account lock request is received for an account via a short message from the account holder. For example, step 201 could include server device 104 receiving a request to lock account 105 from an account holder via a mobile phone as device 101 and short message component 103. In step 202, the lock feature is engaged in response to receiving the request that was received in step 201. In step 203, a transfer of funds from the account is restricted while the lock feature is engaged. The fact that step 201 can be precipitated by an account holder sending a short message provides significant advantages in that, as opposed to a web portal instantiated on a sophisticated electronic device over a high bandwidth communications line, an account holder almost always has access to a short message service through the use of their mobile phone and a standard wireless telephone communications network. Furthermore, a short message can be handled by system 100 without having to hire a large group of customer service representatives as would be required if the lock requests were sent via a voice line telephone system. Also, even if such a system were implemented using an interactive voice recognition (IVR) service, the use of a short message system is more convenient because lock requests generally require very little information, and it is easier to fire off a short message than to dial into an IVR system to provide the same message via an auditory channel.

Certain variations of method 200 differ with regards to the effect of the lock message sent in step 201 and the degree by which the functionality of the account is subsequently limited while the lock feature is engaged. For example, in the situation where the account is a financial account, the lock request may prevent all financial transactions from occurring on the account such that the lock request effects a complete freeze on all transfers in or out of the account. For example, the functionality that is limited may be all of the debit functions associated with a stored value account or all credit functions associated with a line of credit account. As another example, a debit card account may be limited from being used to dispense cash to ATMs or to conduct debit card purchase at a POS terminal. Such approaches present an appealing tradeoff in terms of added security with more limited decreases in utility because there is generally less danger of fraud associated with inflows of funds to an account. In the same light, method 200 could also comprise step 204 in which a preapproved transfer of funds could be allowed while the lock feature was engaged. As such, transactions that were preapproved prior to receipt of the lock request by server device 104 or account 105 would continue as scheduled despite the introduction of the lock request. A more specific example of this feature would be the allowance of automatic bill pay or direct deposit salary payments to be allowed to flow in and out of the account while other transfers were restricted. As a similar example, automatic top-up features for a spending account could remain be accepted even when the lock was engaged The decreased functionality of the account while the lock feature is engaged could also result in the inability of the account to be used in certain classifications of transactions. The classifications could be set by the type of merchant involved in the transaction, the particular identity of a merchant involved in the transaction, the geographical location of the transaction, the time of the transaction, the amounts involved in the transaction, or the frequency of related transactions. The lock feature could prevent the use of the account at specific merchants, specific physical stores, or cash access locations; or could instead prevent the use of the account for all purposes except use at specific merchants, physical stores, or cash access locations. In terms of geographical limitations, the lock feature could prevent any use of the account at POS terminals that are located outside an account holder's zip code, could prevent any use of the account in online transactions, or could prevent any use of the account in a separate state or country from a preselected location identified by the account holder. The lock feature could prevent the use of the account for any transaction exceeding a predetermined monetary value. The classification of transactions that are disallowed could be any transaction that was not preapproved prior to receiving a lock request. The classification of transactions that are disallowed could also be any transaction that was preceded or accompanied by a large velocity of numerous transactions or a limited number of transactions that exceeded a certain monetary threshold.

The decreased functionality of the account while the lock feature is engaged might also be a level of automation associated with the account. For example, the functionality decrease could relate to an increase in the number of verification steps associated with the account (e.g., the lock feature switches an account into a mode in which a PIN or two-step verification is required to conduct transactions where transactions would otherwise be executed without those verification steps). As another example, the increased number of verification steps could involve a requirement that each transaction must be confirmed via a user device such as device 101 (e.g., when the lock feature is engaged, a confirmation request would be sent to user device 101 which would require a confirmatory response via user device 101 for each transaction). As another example, the increased number of verification steps could involve a requirement that a user post-approve prior transactions. More specifically, a user could receive an SMS message at user device 101 after conducting a transaction that included the details of the transaction such as: "Please confirm you just spent $5.68 at Drug Store in Anytown." The user would then confirm the transaction through an SMS response and would be unable to utilize their account in another transaction until they had done so. The advantage of this approach would be that the user could conduct transactions rapidly and could handle the additional step of confirming the transaction at their convenience in-between transactions. This would thereby increase the speed at which transactions could be conducted while still providing a heightened degree of security to the account.

Aside from decreasing the functionality of the account, the lock feature may also result in the account being placed in a state that is more conducive to secure transactions. For example, the lock feature may set the account into a state in which every transaction conducted on the account results in a notification being sent to the account holder. This approach differs from those in which the automation of the account is decreased through the requirement that each transaction be verified by the user, because the transactions will be approved without further action by the account holder. However, the account will still be placed in a condition in which it is easier to deter fraud because the account holder will be able to nearly instantaneously detect if a transaction was conducted on the account that the account holder did not authorize or initiate. This feature could be set so that alerts were only sent for transactions that were not preapproved prior to the lock request being sent. The feature could also be set so that alerts were sent for transactions that were screened according to the configurable lock feature described above (e.g., alerts are only sent for transactions outside a certain geographical area or at certain merchants). Finally, the feature could also be set so that only transactions that rose to a sufficient degree of concern for a fraud monitoring system would trigger a notification to the user.

The characteristics of the lock feature for account 105 described above could be set by a user, the administrator of the lock feature, or the administrator of the account. The presets could be configured by the user via any number of channels including through the use of short message commands through their device 101. As another example, the user could access a web portal to select specific merchants, specific physical stores, or specific geographical locations where the account will still function normally after the lock feature was engaged. The user could also configure the functionality of the account to be decreased by selecting all uses of a financial account to be cut off, or only specific uses such as online purchases or POS transactions to be limited while other functionality such as cash withdrawals at ATMs would still be allowed. Providing administrators of the account with the ability to configure the lock effects could provide significant benefits as the administrator would be able to tailor the risk level associated with particular users to fit the degree by which the lock feature limits usage of the account. For example, an account administrator may set the lock feature to shut down all usages of the account at gas stations in areas where the account administrator has noticed a high incidence of fraudulent transactions.

Variations of method 200 also differ with regards to the relative characteristic of the lock and unlock features. As mentioned previously, specific embodiments of the invention described herein allow a user to restore the functionality of an account that was removed when a lock feature was engaged by unlocking the account. This unlocking action can include the same meta-key described used to lock the account in the first instance. Any disclosure herein regarding how the locking action can be requested, initiated, and implemented also applies to how the unlocking action can be requested, initiated, and implemented. However, embodiments of the invention are not limited to situations where the same methods and systems are applied to the unlocking action and the locking action. Indeed, this disclosure specifically includes embodiments where the actions are processed using different methods and systems. For example, the lock and unlock requests may take different paths to server 104. A locking action could be initiated via a short message sent from a user's mobile phone while an unlocking action might be required to be sent via a phone call to an account management service. As another example, the lock request could be sent only via short message service 103 while the unlock requests would be sent via a web portal accessible via a web browser. The web portal could be provided by the optional second device 106. Aside from the fact that the lock and unlock requests can vary as to how they are sent to the server, they can also vary as to their effect. Although a lock and unlock request will generally cancel each other, an unlock request may have a different characteristic such that an account may transfer from an idle state to a locked state, and then transition to an unlocked state that differs in character from the idle state. The unlocking action could also only partially restore the decreased functionality, and additional procedures might need to be followed before functionality was completely restored. In effect, the various particular examples of lock and unlock requests provided herein can be used in any combination, while it should be generally assumed that any disclosed lock or unlock request can be combined with a matching unlock or lock request that reverses the action of its partner.

Certain benefits can be achieved by requiring the locking and unlocking requests to be provided via different channels. Firstly, the effect of a locking action on an account generally creates less risk of fraud and more risk of account holder frustration than an unlocking action. Therefore, depending upon the relative concerns of risk and account holder convenience that the features were meant to provide, the actions can each be limited to a more secure though less convenient channel. In an example where fraud was the main concern, the locking requests may be received via a short message service, a web portal, or a telephone call to a live consumer representative or IVR system; while the unlocking request could only be received by a telephone call to a live consumer representative. Aside from different channels being more secure than others, the requirement of having more than one channel required to access the features provides security by itself because it is less likely that two channels of communication will be compromised.

Although a majority of the methods disclosed herein treat the nominal state of the account as being unlocked, this disclosure does not limit the methods to being used in such a manner. Indeed, numerous benefits can be realized by keeping the account nominally in a locked state and utilizing the convenient lock and unlock procedures described here to unlock the account only when it is needed for immediate use by the account owner. As described in more detail later, the availability to conveniently unlock and lock an account via a text message or other methods discussed below will allow a person to unlock their accounts only so long as is necessary to conduct a transaction, and then return their accounts to a lock state.

Certain variations of method 200 also differ with regards to the transitory nature of the lock or unlock features. The lock or unlock features can be transitory in that their temporal duration is limited. In the case of a financial account with an unlock feature, the feature may be transitory in that a limited number of transactions are allowed or a certain monetary allowance can be expended before the lock feature is reengaged. For example, method 200 could also comprise steps 205, 206 and 207 in which the duration of the lock request is temporally limited. In step 205 the lock feature on the account is disengaged. In step 206, a period of time for which the lock feature has been engaged could be measured. In step 207, the lock feature could be disengaged when the monitored period of time exceeded a preset period of time. The preset period of time could be set by a communication received from the account holder prior to receiving the account lock request or could be predetermined by the administrator of the account.

The effect of the lock and unlock requests in terms of the transitory nature of the locked and unlocked states may be configurable by the user. For example, the user may be able to select a certain period for which the account will be unlocked. This may be a single set period of time or it could be a recurring period. The user could specify that the account should be unfrozen in the morning on all weekdays, but remain frozen at all other times. The user could specify that the account should remain unlocked for 15 minutes and then automatically revert to a locked state. As another example, the user may be able to select a number of transactions or a certain dollar amount that may be spent during the unlocked period before the account automatically returns to a locked state. More specifically, the user could unlock the account for $100 worth of spending or for 5 total transactions. After the account had been subsequently used to spend $100 or conduct 5 transactions, the account would revert to the locked state. The dollar limit could be set as a hard ceiling such that a final transaction exceeding the dollar amount was denied, or a soft ceiling such that a final transaction exceeding the dollar amount was first approved before the account reverted to the locked state. The effect of the lock and unlock requests in terms of the transitory nature of the locked and unlocked states may be configurable by the administrator of server 104 and/or account 105. For example, the administrators could also mandate the duration of the unlock action to be limited to a certain amount of time, and not allow the user to configure the duration beyond that preset maximum. Any of the transitory limits that may be configurable by the user could have ceilings set by the administrators.

Variations of method 200 also differ with regards to the content of the message requesting the lock request. As another example, in situations where multiple kinds of lock features are allowed for a single account, the message could indicate through its content which lock feature was currently being requested. Method 200 could therefore be modified to include step 207 in which a second lock request for the account was received, and step 208 in which a second lock feature was engaged. The two lock features could differ as to the degree by which they inhibited the functionality of the account. The features can also differ with regards to the information content required by the lock or unlock request. In the case of lock requests sent via a short message, a trade off would thereby be created between the spectrum of available features against the convenience of sending each lock request as users would need to memorize the different kinds of textual contents required to send specific lock requests.

The lock request message can take on various forms. For example, the request could be a text message sent by a user via device 101. The text message could include a code known to account server 104 that specifically identifies the user such as a PIN. The text message could also include information to identify a particular electronic account. This would be particularly useful in situations where system 100 would allow a single user to lock multiple accounts independently. However, such a system would not require a user to identify a particular account since a global lock command could be sent to multiple accounts based off a single lock request. The text message could also include a text string to identify if and what type of a lock feature was being requested. This would be particularly useful in situations where system 100 allowed a user to perform multiple functions via device 101. For example, if a user could access their account's balance via a short message service the text string "BAL" might be used to distinguish a lock request identified using the text string "LOCK."

Different lock features could be identified by different text strings. For example, a lock feature that put the account into a state where confirmation was required from the user via their mobile device to approve every transaction on the account could be engaged using a lock request message containing the text string "CONFIRM." As another example, the account could be put into a full shut down where no transactions were allowed at all using a text string such as "FREEZE" or "FRZ" to differentiate the message from a message that would place the account in a situation where preapproved transactions were still allowed. This alternative kind of lock request message could be identified using the text string "STOP."

Different unlock features could likewise be identified by different text strings. Even in situations where an account only offered a particular kind of lock feature such that a single command could be used to switch the account between lock states, it would be beneficial to design the system such that two different commands were required from the user to switch the lock feature between an engaged and disengaged state. Requiring two commands would prevent the user from losing track of which state their account had been placed in. As an example of a different text string, the "STOP" feature described above could be paired with an "UNSTOP" command to disengage that particular lock feature. Like the lock commands, the unlock commands could also require additional information to identify a particular account or to confirm the identity of the party requesting the change in the account's state. The text strings could also be modified to include information about the particular variation of certain lock and unlock features that were being engaged. For example, the text string "UNSTOP10" could indicate that an account holder wished to switch their account into an unlocked state for 10 minutes before reverting to a particular locked state corresponding to the "STOP" command. In situations where the features were varied to an even greater degree, such that a user could specify transitory unlock periods based on temporal or monetary limitations, additional symbols such as the dollar sign could be employed to distinguish between the two. For example, "UNSTOP$10" could indicate a user want to unlock their account until $10 had been spent while "UNSTOP10" would indicate a user wanted to unlock their account for 10 minutes.

Although a PIN may be required, the lock and unlock request message would not necessarily have to include information input by the user to identify that user. Instead, the identity of the user could be determined from the nature of the communication itself. For example, server 104 could determine the identity of the user by stripping the information from a text message sent through communication system 102. In these situations, caller ID information could be stripped from the message to determine the identity of the account holder. The request could also be imbued with user identifying information associated with device 101 such as a software token generator or a hardware identifier that is added to requests that are generated by device 101. The hardware identifier could be coded in ROM in the device as it is manufactured or added by a removable memory such as a SIM chip or any nonvolatile memory device. The hardware identifier could also be a defect signature associated with the device that is detected by a subsystem of device 101 after the device has been produced. The user could also be identified using any kind of biometric input taken in by device 101, or a service provider issued user identifier that can be used in conjunction with device 101.

Certain variations of method 200 also differ with regards to the types of accounts the lock feature is associated with and what kinds of transfers are allowed in step 204. With reference again to FIG. 1, the electronic account 105 could be any electronic account. For example, the account could be an account used to manage a service such as an online shopping portal, an email account, an online media access account, a bank account, or any online service account. In general, the electronic account 105 described herein may be similar to the accounts, and include all of the attendant features, described in: U.S. patent application Ser. No. 13/755,421 entitled "Self-authenticating peer-to-peer Transaction" filed Jan. 31, 2013; U.S. patent application Ser. No. 13/786,408 entitled "Accounts with Multiple Pre-Authorization Levels" filed Mar. 5, 2013; and U.S. Prov. Patent Application No. 61/782,593 entitled "Purchasing Method with Funding Source Selection" filed Mar. 14, 2013; which are all owned by the assignee of the present invention, and incorporated herein by reference in their entirety for all purposes. More generally, the account could be a funding source associated with a payment account and the transfers allowed in step 204 could be standard payments made directly from the account while the transfers restricted in step 203 could be transfers from the funding source to the payment account.

Figure 3:
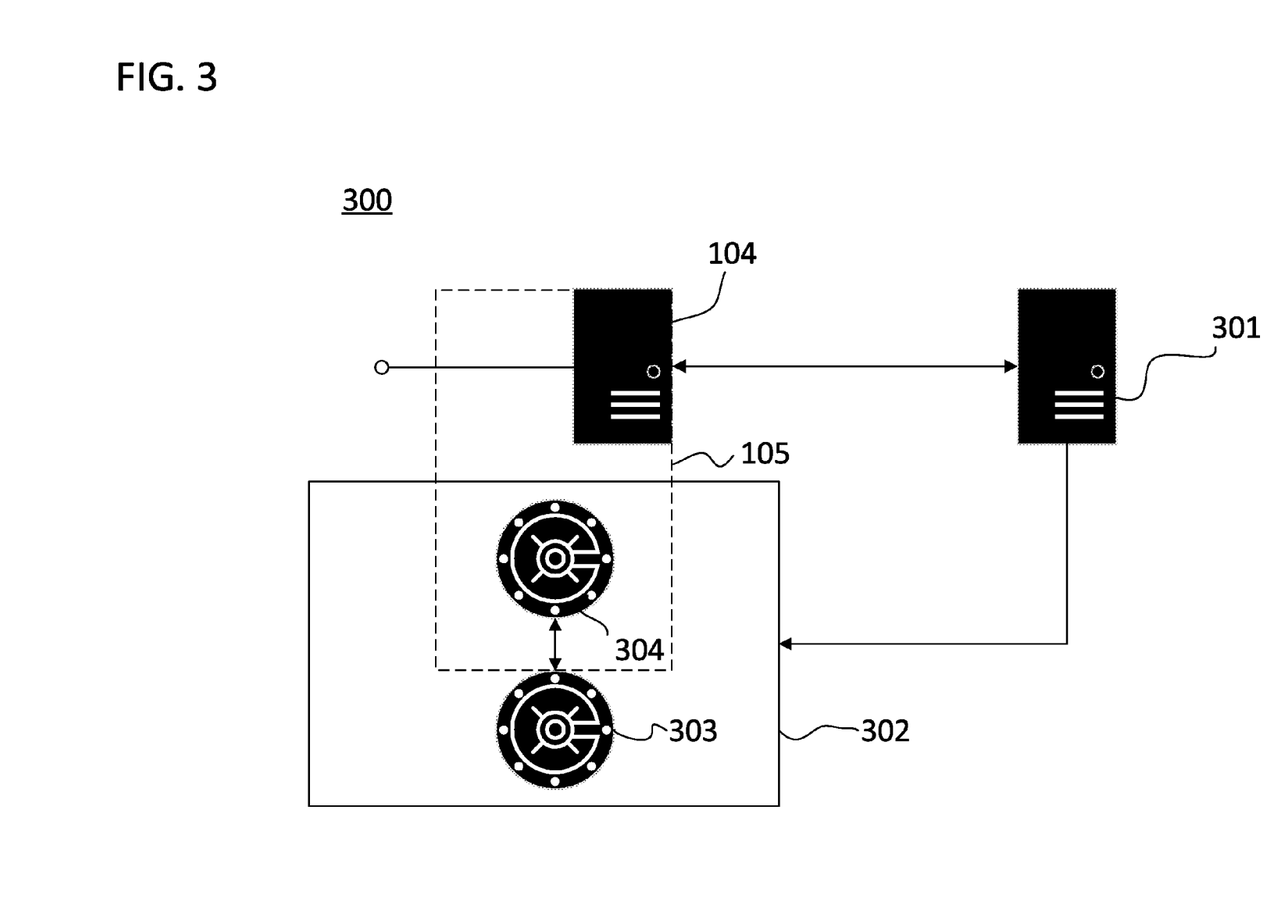
FIG. 3 is a block diagram of an account control system to be used with a payment account that is in accordance with an embodiment of the present invention.

FIG. 3 illustrates more specifically the interaction of account 105 and server device 104 in system 100 in the particular situation where the account is associated with a payment account administrated by a payment service having its associated funds stored in an account held by a financial institution. System 300 includes server device 104 shown in FIG. 1. In the embodiments illustrated by FIG. 3, server 104 is administrated by a payment service, and is utilized to provide account holders with control over payment account 105. The payment service provides its users with access to the funds stored in payment account 105 through cooperation with a financial institution that administrates server 301 and deposit or credit accounts 302. The two accounts administrated by the financial institution that are illustrated in system 300 are a demand deposit account 303, used as a funding source, and payment service user account 304 used to make payments using the payment system. Demand deposit account 303 can also be any kind of standard account managed by a financial institution. Accounts 304 and 303 can be administrated by separate financial institutions. Funds are transferred between account 303 and 304 to "put money into" or "pull money out of" the payment system. Payment account 105 is drawn to incorporate the channel by which money flows between the accounts because, subject to the financial institution's limitations, the payment service provides its account holders with the ability to transfer money between these two accounts. In this particular example, a lock request can prevent a specific kind of transaction from taking place. When this particular lock feature is engaged, no money can flow from account 303 to 304. This is beneficial because account holders will be able to determine how much money they want to trust with the payment service and obtain the convenience of having available funds in a payment account, while relying on the additional security of the lock request to keep the remainder of their funds safe. In other embodiments, a lock feature may be set to prevent money from flowing in either direction to prevent people from removing money from the system in an unauthorized manner.

Figure 4:
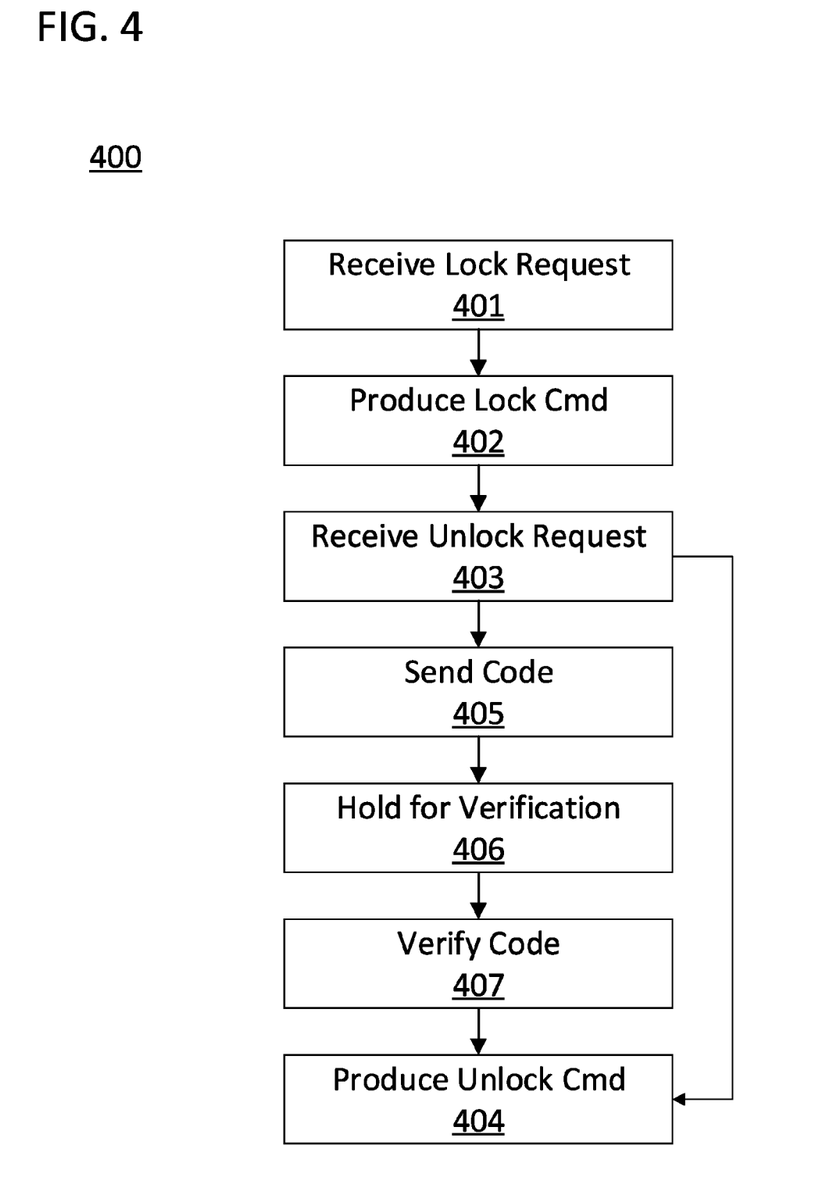
FIG. 4 is a flow chart illustrating a set of methods for providing a user controlled account lock feature for an electronic financial account that are in accordance with an embodiment of the present invention.

Another computer-implemented method 400 for providing a user controlled account lock feature for an electronic account is illustrated in FIG. 4. The electronic account can be any of the accounts described above with reference to account 105. Method 400 includes a step 401 of receiving a lock request. In specific embodiments of the invention the lock request in step 401 is a request to lock an electronic account such as electronic account 105 received at a server device such as server device 104 from a device associated with a user such as device 101. In specific embodiments of the invention, the request is routed through a communication system such as communication system 102 having a short message component such as short message component 103. In specific embodiments of the invention, the device can be used to communicate through a communication system such as communication system 102.

Method 400 includes a step 402 of producing a lock command. In specific embodiments of the invention, step 402 will be executed by a processor that is in communication with a server device such as server device 104. This relationship does not exclude the possibility of the processor being a part of server device 104. In specific embodiments of the invention, the lock command will be produced in response to the request to lock the account from step 401 and will be used to limit a functionality associated with an electronic account such as electronic account 105. Step 402 could comprise discerning the type of lock command to produce based on the content of the message used to send the lock request. For example, in situations where the associated account was only amendable to a single kind of lock request, the lock command could be generated without further processing when the lock request was received. However, in situations where multiple possible lock features are available for a different account, the content of the lock request would need to be analyzed to produce the lock command. To use an example discussed previously, the lock request could contain a text string such as "STOP10" whereby step 402 would comprise the dissection of that command to determine that access to the account should be kept in a limited state for 10 days. The actual decoding of the lock request message content to the lock command may need to rely on instructions provided to the account holder before-hand so that the commands they send would provide the results they desired. The production of the lock command in 402 could also include sending a confirmation back to the user to confirm that their lock request was received and put into action. For example, after receiving the text string "STOP10," a text message could be sent to the account holder's phone saying "A stop has been placed on your account for 10 days." The text message could also include a description of what functionality was limited by the stop, and directions on how to disengage that particular lock feature.

The lock command can exert its influence over electronic account 105 in various ways. For example, if the server device 104 and electronic account 105 were operated by the same entity, the server could communicate with the electronic account behind a common firewall and directly instruct the account to limit its functionality. If the electronic account 105 and server 104 were administrated by different entities, the command could be sent by a public or private network and could be selectively handled by the administrator of electronic account 105. The communication between the administrator of server device 104 and 105 could be encrypted using any combination or private and public key encryption standards. As another example, the administrator of server device 104 could contact the administrator of the electronic account through other means such as a phone call between employees of the two entities to request that a lock feature for electronic account 105 should be engaged. In specific embodiments of the invention, the lock command is generated, passed to the electronic account, and takes its effect automatically without any direct human intervention or additional processing. Thus, after the lock comment is generated and passed to the electronic account, it takes its effect directly.

Method 400 includes a step 403 of receiving an unlock request. In specific embodiments of the invention, step 403 will involve a server device such as server device 104 receiving the unlock request. The unlock request can be sent by a device associated with the user such as user device 101 and it can optionally be sent by device 106. As described above, the unlock request can generally be aligned with the lock request. The content of the request can identify the user and specify the account to be unfrozen, and it can also specify particular degrees of functionality to restore in the unlocking action. The fact that a request was received can also be used to infer that a particular account and functionality are related to the request; the simplest example being a one account system with one level of functionality specified such that the request was a simple toggle between locked and unlocked states requiring minimal information. Likewise, as described above, the message itself can be used to identify the user and a set of predefined rules can map the content of the request to specific accounts and specific degrees of functionality to restore.

As stated previously, the lock and unlock requests can be sent from an account holder's cell phone via a short message service or via any other communication channel that can carry a message from the account holder to the administrator of the lock feature. The lock and unlock feature can also both be initiated based on a command sent from a device associated with a user that is triggered by a location identification service signaling that a user is in a particular location. For example, a GPS locator in a user's phone could be configured with an application that would send short messages automatically when the user was in a certain area. As another example, specific merchants could employee proprietary standards on wireless local area networks that would communicate with a user's device to trigger the user's device to send a message to a server such as server 104. The merchants could also identify the users through an identifier associated with the user's device that could be detected when the user entered a specific location. The identifier could be detected using the proprietary networks mentioned previously, an RFID reader, or any kind of NFC system. The approaches could also allow a user to automatically lock their account when traveling by having their devices automatically send a lock request when it detected that the user was away from their home zip code or state. These embodiments would not require an affirmative action by the user besides entering or exiting the predefined area.

Lock and unlock requests could also be sent from an account holder's device through an affirmative action taken by the user to indicate that they are at a particular location. In accordance with these embodiments, merchants could display NFC tags or QR codes in their stores that a user could interact with to affirmatively unlock their account by triggering the user's device to send a lock or unlock request from the device to servers such as server 104. For example, a user at a checkout counter could scan the QR code to send an unlock request from their phone to server 104, and then scan the QR code again to send a lock request once the transaction was completed. These approaches would beneficially allow users to keep their accounts locked until they were actually present in a store and ready to conduct a transaction.

The manner in which geographical automatic requests are sent to server 104 could be preconfigured by the entity responsible for administrating account 105. However, they could also be configured by the account holders themselves. The account holders could, for example, configure particular locations at which to have the lock or unlock requests automatically sent to the administrator of the lock feature. The particular locations could be set by the user through a web application with reference to an interactive map of particular regions or locations. The geographical locations could also be set automatically by the account holder through the selection of particular merchants. The merchant selection information provided by the users could then be combined with location information known by the administrator of the account or the lock feature to enable the lock or unlock requests to be sent whenever the account holder entered an establishment operated by the selected merchants. For example, the administrator could add the account holder to a list of users to be detected automatically by the merchant's systems. Alternatively, the administrator could rely on a predetermined list of GPS coordinates associated with the merchant's locations and send the lock or unlock requests automatically when the user's location aligned with any of the coordinates on that list. The account holders could also select particular locations using a smart phone application. The application could have the features of the web portals described immediately above. The account holder could select particular locations by informing a clerk at a store that had a particular relationship with the service provider. As an example of a specific utilization of some of these features, an account holder could configure their account so that the unfreeze command was sent automatically every time a user entered a particular location such as a local convenience store.

Method 400 includes a step 404 of producing an unlock command. In specific embodiments of the invention, server device 104 will be used to produce an account unlock command in response to the request to unlock the account. In specific embodiments of the invention, the account unlock command will be used to restore the functionality associated with the electronic account. The manner in which the unlock command exerts its influence on the account can be any of those described above with reference to the lock command.

In specific embodiments of the invention, method 400 could also include a step 405 of sending a confirmation code, step 406 of holding for verification, and a step 407 of verifying a confirmation code. As mentioned previously, since unlocking an account generally provides more risk to the account than freezing the account, the methods associated with verifying the request received in step 403 before producing an unlock command in step 404 can be more tightly constrained than those associated with the lock command. The confirmation code sent in step 405 can be sent to a device associated with a user such as the user's mobile telephone. The user can then parrot that code back to the server device using their mobile telephone or some other method of communication. The confirmation code will then be received and verified by the server device in step 407 before producing the unfreeze command in step 404. This approach could utilize the fact that the user will generally be the only person in possession of their cell phone in order to authenticate the transaction. If another channel is used, the approach could be combined with the security offered by the fact that the account holder would need access to both the method used to initiate the transaction, and the second channel required for verification to verify the transaction. For example, step 407 could include a user logging in to a web portal offered by the administrator of the lock feature using a user name and password confirmation before the user could be prompted to enter the temporary code received in step 407 and move the process on to the generation of the unlock request in step 404.

Figure 5:
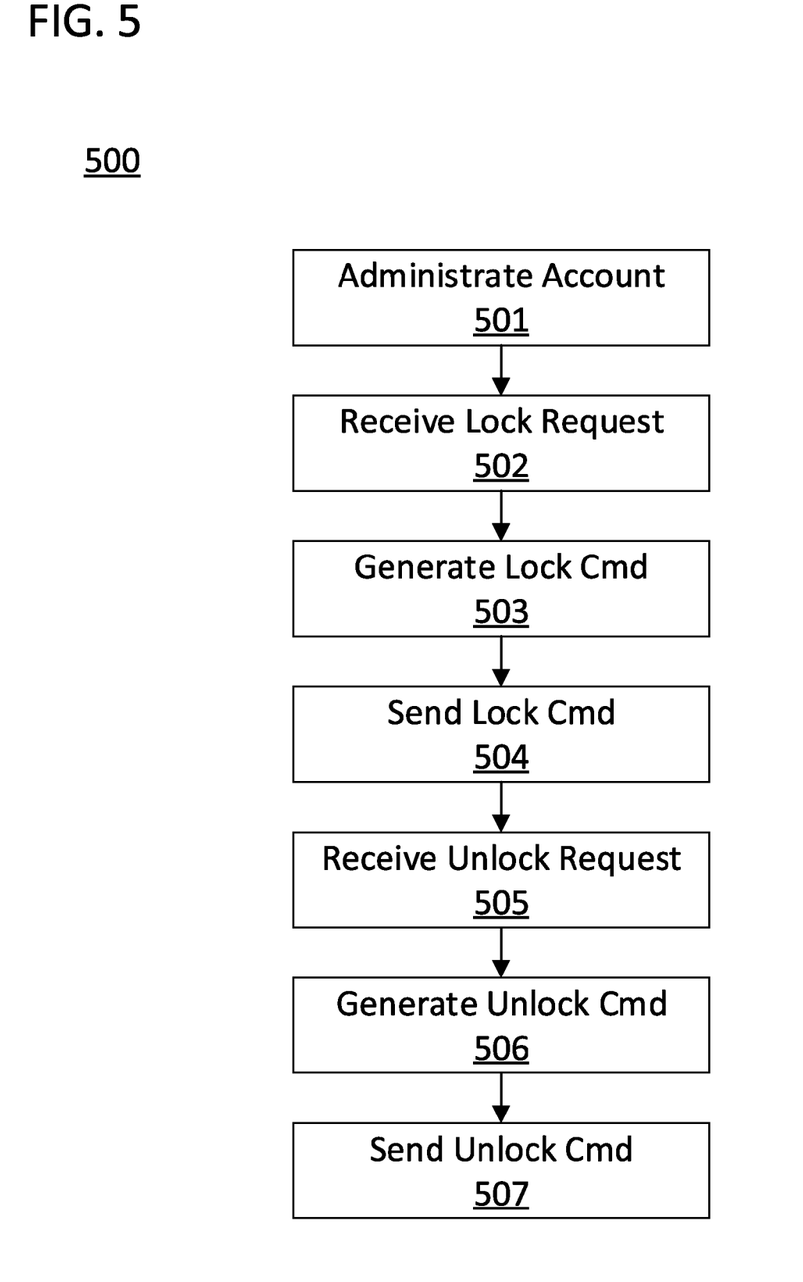
FIG. 5 is a flow chart illustrating a method for providing a barrier between a funding source and a payment account that is in accordance with an embodiment of the present invention.

A computer-implemented method 500 for providing security to a payment account that is in accordance with embodiments of the present invention can be described with reference to FIG. 3 and FIG. 5. Method 500 includes a persistent step 501 in which an electronic payment account such as account 105 is administrated by a payment service. Account 105 can take on all of the characteristics of account 105 mentioned previously. In particular, account 105 can include the aspect of being connected to a payment account administrated by a financial institution as was described with reference to FIG. 3. Method 500 proceeds with the receipt of a lock request in step 502 and the generation of a lock request in response to the receipt of that lock request in step 503. Computer-implemented method 500 also includes step 504 in which the lock command is sent to the financial institution that provides the payment account for the electronic payment account administrated by the payment service. These steps can include all of the variations discussed above with reference to the lock and unlock requests discussed above in terms of how the request can be sent and the characteristics of the lock features requested. In particular, the lock command generated in step 503 can include instructions for a financial institution to prevent all transfers into an account associated with a payment service. For example, the command could include instructions to isolate all transfers from account 303 into account 304 in FIG. 3. Computer-implemented method can also include steps 505 in which an unlock request is received at server device 104, as well as steps 506 and 507 in which the unlock command is generated and sent to the financial institution. Steps 506 and 507 can therefore mirror the steps 502 and 503 with the exception, of course, that an unlock command is being delivered to the financial institution instead of a lock command. In specific embodiments of the invention, the unlock command can return the accounts to a state where funds can be transferred at the account holder's discretion from the bank account to the payment account.

The manner in which the financial institution responds to the lock and unlock commands sent in steps 504 and 507 depends on the characteristics of the electronic payment account. The electronic payment account 105 may have various funding sources in place of account 303 in FIG. 3. For example, the funding source could be a credit or stored funds account administrated by the financial account or it could be a funding source for which the financial institution has sufficient information necessary to initiate a transfer from those funding sources into payment account 304. The stored funds accounts could be a standard demand deposit bank account. In these situations, the financial institution could respond to the lock command by preventing all transfers from the funding source represented by account 303 into the payment account 304. The financial institution could also, instead, restrict all transfers associated with account 304 which would render the payment account completely unusable for a time, but would also protect the account holder for any unauthorized use of their electronic payment account.

As compared to some of the approaches described in the background section, some of the embodiments described herein do not require high end devices that are capable of storing and manipulating secure account credentials. Instead, the embodiments described herein that utilize a short message service for transmitting lock requests only require a low-end cellular telephone or other simple mobile device. As a result, the embodiments described herein are not limited to more sophisticated mobile devices such as smart phones. This is a significant benefit because the markets for less sophisticated mobile devices are still considerable and increasing their use in fraudulent transactions is therefore still important. Furthermore, even in situations where the relevant account holders are already smart phone users, the introduction of complex fraud detection and account security applications still requires the development and maintenance of the associated systems and programs; and simpler approaches would eliminate the costs associated with those endeavors. Finally, there are significant advantages to providing one system which may be utilized by smart phones, low-end cellular telephones and other mobile devices.

In the prior description, it is understood that all messages involved can be sent via a number of means; for example, wired or wireless voice or data channels, or the like. These means may be private or explicitly secure communication means; for example, encrypted voice or data channels, or the like. Communication means include (i) messages to and/or from a mobile device such as email messages, voice calls, data messages, text messages, messages sent via other applications (e.g., Facebook, Linked In, Skype and the like) and (ii) the same sort of messages sent to and/or from a stationary device such as a desk top computer or browser running on a television.

The above description illustrates various embodiments along with examples of how aspects of the present invention may be implemented. For example, direct communication, U.S. mail, phone calls, text messages, data messages or e-mail through wired or wireless voice or data channels, encrypted or not encrypted, and the like may all be considered communication means. A mobile device may be a mobile phone, two-way pager, tablet or notebook computer, and the like.

The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents will be evident to those skilled in the art and may be employed without departing from the spirit and scope of the disclosure as defined by the claims.

What is claimed is:

1. A computer-implemented method for providing a user with an account lock feature for an electronic financial account, the method comprising:
   receiving, at a server device from a first device associated with the user, a request to lock the electronic financial account, the request being routed through a short message component or a data message component of a communication system, and the first device associated with the user being used to communicate via the communication system;
   producing, using a processor in communication with the server device and in response to the request to lock the electronic financial account, a lock account command, the lock account command being used to limit usage of the electronic financial account for a financial transaction;
   receiving, at the server device from a second device that is operated by the user, a request to unlock the electronic financial account; and
   producing, using the processor and in response to the request to unlock the account when the first device is not the same as the second device, an account unlock command, the account unlock command being used to restore functionality associated with the electronic financial account, and the processor not producing the account unlock command when the first device is the same as the second device;
   wherein the user is an owner of the electronic financial account.

2. The computer-implemented method of claim 1, wherein the lock account command is used to limit the account from being used in any transaction involving a debit to the electronic financial account.

3. The computer implemented method of claim 1, wherein the request to lock the electronic financial account is sent via text message.

4. The computer-implemented method of claim 1, further comprising:
   sending, from a server device, a temporary confirmation code to be delivered to the device associated with the user using the short message component or the data message component of the communication system;
   after the step of sending the temporary confirmation code, receiving and verifying the temporary confirmation code; and
   after the step of receiving the request to unlock the account, holding to execute the step of producing the account unlock command until the step of verifying of the temporary confirmation code has been successfully completed.

5. The computer-implemented method of claim 1, wherein the request to lock the electronic financial account is generated automatically based on a geographical location of the user matching a predetermined geographical location.

6. A computer-implemented method for providing security to an electronic payment account comprising:
   a server device administrating the electronic payment account, the electronic payment account allowing an account holder to make payments from a financial institution payment account administrated by a financial institution;
   the server device receiving a lock request from an account holder via a first device;
   the server device generating a lock command directly in response to receiving the lock request;
   the server device sending the lock command to the financial institution, the lock command instructing the financial institution to restrict transfers from a funding source account to the financial institution payment account;
   the server device receiving an unlock request from the account holder via a second device;
   the server device generating an unlock command in response to the receipt of the unlock request when the second device is not the same as the first device, the server device not generating the unlock command in response to the receipt of the unlock request when the second device is the same as the first device; and upon generating the unlock command, the server device sending the unlock command to the financial institution.

7. The computer-implemented method of claim 6, wherein the funding source account is a bank account.

8. The computer-implemented method of claim 6, wherein the lock request is received from the account holder via a communication channel consisting essentially of a short message service component.

9. The computer-implemented method of claim 6, wherein the unlock request is a request to unlock the electronic payment account for a limited time.

* * * * *